(12) United States Patent
Gu et al.

(10) Patent No.: US 11,161,198 B2
(45) Date of Patent: Nov. 2, 2021

(54) HIGH-FREQUENCY VIBRATION WELDING CONDITIONING SYSTEM AND METHOD THEREOF FOR ACHIEVING BETTER METAL MATERIAL PROPERTIES

(71) Applicant: Shanghai Maritime University, Shanghai (CN)

(72) Inventors: Bangping Gu, Shanghai (CN); Xiaolan Yan, Shanghai (CN); Xiong Hu, Shanghai (CN); Wei Wang, Shanghai (CN); Jian Zhu, Shanghai (CN)

(*) Notice: Subject to any disclaimer, the term of this patent is extended or adjusted under 35 U.S.C. 154(b) by 365 days.

(21) Appl. No.: 16/344,423

(22) PCT Filed: Jun. 13, 2018

(86) PCT No.: PCT/CN2018/090918
§ 371 (c)(1),
(2) Date: Apr. 24, 2019

(87) PCT Pub. No.: WO2019/119742
PCT Pub. Date: Jun. 27, 2019

(65) Prior Publication Data
US 2020/0016683 A1    Jan. 16, 2020

(51) Int. Cl.
*B23K 20/10* (2006.01)
(52) U.S. Cl.
CPC .................. *B23K 20/10* (2013.01)
(58) Field of Classification Search
None
See application file for complete search history.

(56) References Cited

U.S. PATENT DOCUMENTS 3,396,892 A * 8/1968 Balamuth ............... B06B 1/00
228/1.1
3,622,404 A * 11/1971 Thompson ............... C22F 1/00
148/558
(Continued)

FOREIGN PATENT DOCUMENTS

CN          103128454 A       6/2013
CN          103394783 A       11/2013
(Continued)

*Primary Examiner* — Devang R Patel
(74) *Attorney, Agent, or Firm* — Lei Jiang, Esq.; Lei Jiang LLC

(57) ABSTRACT

A high-frequency vibration welding conditioning system for achieving better metal material properties is disclosed, which comprises a host computer, a signal generator, a power amplifier, a high-frequency vibrator, a high-frequency vibration energy amplification and transfer device, an acceleration sensor, and a cooling module, the host computer controlling the signal generator to output a sinusoidal excitation signal which is independently and continuously adjustable in amplitude and frequency, the sinusoidal excitation signal being inputted to the high-frequency vibrator via the power amplifier. A method for achieving better metal material properties by the high-frequency vibration welding conditioning system is also disclosed, which comprises steps of manufacturing the high-frequency vibration energy amplification and transfer device, manufacturing a stepped mounting block, clamping a small-sized specimen on a pallet, determining output excitation frequency of the signal generator for high-frequency vibration welding, and performing high-frequency vibration welding process on the small-sized specimen. The present invention has the advantage of being capable of performing high-frequency vibration welding process on a metal material during solidification crystallization process and a metal solid material, (Continued)

thereby achieving better metal material properties right from the source of defect.

5 Claims, 2 Drawing Sheets

(56) References Cited

U.S. PATENT DOCUMENTS

| | | | | | |
|---|---|---|---|---|---|
| 3,677,831 | A | * | 7/1972 | Pezaris | C21D 10/00 148/508 |
| 4,376,883 | A | * | 3/1983 | Dao | B23K 11/253 219/109 |
| 4,381,673 | A | * | 5/1983 | Klauba | C21D 10/00 148/558 |
| 4,527,727 | A | * | 7/1985 | Renshaw | B29C 66/8242 228/1.1 |
| 5,242,512 | A | * | 9/1993 | Bagley | G01N 29/12 148/558 |
| 5,253,528 | A | * | 10/1993 | Varterasian | B23K 31/12 73/582 |
| 6,181,431 | B1 | * | 1/2001 | Siu | G01H 9/00 356/432 |
| 6,932,876 | B1 | * | 8/2005 | Statnikov | B06B 1/0253 148/558 |
| 8,672,211 | B2 | * | 3/2014 | Cai | B23K 20/10 228/103 |
| 9,296,065 | B2 | * | 3/2016 | Hesse | B06B 1/0607 |
| 9,851,332 | B2 | * | 12/2017 | Yusuf | G01N 29/4436 |
| 2004/0089812 | A1 | * | 5/2004 | Favro | G01N 29/228 250/341.6 |

FOREIGN PATENT DOCUMENTS

| | | |
|---|---|---|
| CN | 105855655 A | 8/2016 |
| CN | 106695125 A | 5/2017 |
| JP | 2011092949 A | 5/2011 |

* cited by examiner

HIGH-FREQUENCY VIBRATION WELDING CONDITIONING SYSTEM AND METHOD THEREOF FOR ACHIEVING BETTER METAL MATERIAL PROPERTIES

FIELD OF INVENTION

The present invention relates to the field of welding technology, and relates in particular to a high-frequency vibration welding conditioning system and method thereof for achieving better metal material properties.

BACKGROUND ART

Welding is an important material forming process and is widely used in fields of aerospace, marine engineering, automobile, etc. However, welding is a process in which a localized area of the material is rapidly heated and cooled and a non-uniform temperature field causes residual stress in the formed material, especially in the weld area, where a large tensile residual stress is generated, thereby reducing the yield strength and fatigue life of the material, increasing the stress corrosion cracking effect, and causing deformation and crack initiation, propagation, and cracking of the material. Therefore, eliminating the tensile residual stress generated during the welding of a material has always been an important research topic in the field of mechanical manufacturing technology.

Traditional residual stress relief technology includes natural aging and thermal stress relief. Natural aging technology is the oldest aging method but the aging technology has poor processing effect, and takes too much time and large floor space. Compared with natural aging technology, thermal stress relief technology greatly shortens the cycle of aging and is widely used. However, the shortcomings of thermal stress relief technology are also obvious: long aging cycle, high energy consumption, easy oxidation of the workpiece, high economic cost, serious environmental pollution, and difficulties in handling large, small-sized workpieces, or those that are easily damaged when heated, as well as assemblies that cannot be heat treated after assembly.

Magnetic processing technology is an aging method that improves the residual stress distribution in a component by interaction of a dynamic magnetic field with a steel material. Magnetic processing technology has the features of simple operation and low energy consumption, but the technology can only handle ferromagnetic materials. Electric current pulse stress relief technology is characterized in that high-energy pulse current is injected into the interior of a material to excite the movement of charged particles inside the material, finally achieving the purpose of reducing the residual stress inside the material. The electric current pulse stress relief technology has the characteristics of simple processing equipment and less environmental pollution, but the pulse current energy generated by capacitor discharge is limited, and only small-sized components can be processed. Explosion method and hammering method are two aging technologies that utilize mechanical means to eliminate residual stress. The effect of the latter two methods to eliminate residual stress is limited, and the explosion method is only applicable to materials that remain undamaged under the impact of strong shock waves. The hammering method requires a hammerer commanding a rather high operating proficiency and a good grasp of timing of the hammering.

The vibratory stress relief technology uses vibration to make the sum of the residual stress and additional vibration stress of the component exceed the yield limit of the material, and a slight plastic deformation occurs inside the material, so that the internal residual stress of the material is reduced. The vibratory stress relief technology has the characteristics of good processing effect, short processing time, less environmental pollution, low energy consumption and easiness to perform operation on site, and is a highly efficient, energy-saving and environmentally-friendly stress relief technology which owns the potential to replace traditional thermal stress relief technology in the 21st century.

It can be seen from the above research on various residual stress relief processes that they all eliminate the residual stress of metal solid materials, but for a workpiece with solidification process as final processing step thereof, the influence of the solidification process is particularly important. For a workpiece that have to be further processed after solidification, the effect of solidification is also particularly pronounced because the coarse microstructures and defects formed during the solidification process are difficult to eliminate in further processing. Therefore, controlling the solidification process at the beginning of material manufacturing is of particular importance.

In summary, it is not difficult to find that each of the residual stress relief processes described above can eliminate residual stress of the welded metal materials to some extent, but the metal will be melted under the high temperature of welding process and microscopic coarse defects occur during solidification and crystallization, which are difficult to eliminate by residual stress relief process. At the same time, with the continuous development of micro-manufacturing technology, the application of small-sized workpieces is becoming more and more extensive, for example the development of MEMS device toward smaller size, but the residual stress generated during the welding of small-sized workpieces will have a serious impact on material properties, and residual stress relief for small-sized workpieces has become an important research topic in the field of micro-manufacturing technology.

In order to achieve better post-welding metal material properties, the present invention proposes a high-frequency vibration welding conditioning system and a method thereof for achieving better metal material properties, which is particularly suitable for achieving better post-welding properties for a small-sized workpiece.

SUMMARY OF THE INVENTION

In order to achieve better post-welding metal material properties, the present invention proposes a high-frequency vibration welding conditioning system and a method thereof for achieving better properties of metal materials, wherein metal materials are subjected to high-frequency vibration during the welding process, thereby realizing the purpose of achieving better properties of metal materials while solidifying and crystallizing the metal at the mean time, and is particularly suitable for improving the post-welding properties of a small-sized workpiece.

The high-frequency vibration welding conditioning system for achieving better metal material properties of the present invention comprises a host computer, a signal generator, a power amplifier, a high-frequency vibrator, a high-frequency vibration energy amplification and transfer device, an acceleration sensor, and a cooling module; the host computer controlling the signal generator to output a sinusoidal excitation signal which is independently and continuously adjustable in amplitude and frequency; the sinusoidal excitation signal is inputted to the high-frequency vibrator via the power amplifier.

The high-frequency vibration energy amplification and transfer device is mounted on a vibration mesa for a moving part of the high-frequency vibrator, and the high-frequency vibration energy amplification and transfer device comprise a pallet for mounting a high-frequency vibration welding specimen, a chassis fixed on the vibration mesa, and a connecting rod connecting the pallet and the chassis; the cross-sectional area of the connecting rod being smaller than the cross-sectional area of the pallet and the chassis.

The acceleration sensor is mounted on the upper surface of the pallet, an output port of the acceleration sensor is connected to an input port of a charge amplifier, the output port of the charge amplifier is connected to an input port of an oscilloscope, and the oscilloscope is connected to the host computer.

Specifically, the pallet for mounting the high-frequency vibration welding specimen is placed in a welding chamber, the small-sized specimen to be welded is mounted on the upper surface of the pallet, and high-frequency vibration welding is performed on the small-sized specimen at a resonance frequency of the high-frequency vibration energy amplification and transfer device, which is capable of achieving better post-welding properties for the small-sized specimen.

Further, the cooling module comprises a water inlet, a cooling water passage, and a water outlet.

Further, the welding chamber is mounted on a welding chamber supporting device, the welding chamber supporting device is mounted on a welding chamber base; the high-frequency vibrator is mounted on a high-frequency vibrator base.

Further, a spring element is utilized to support the pallet on which the high-frequency vibration welding specimen is mounted.

Further, the acceleration sensor is a piezoelectric acceleration sensor.

Further, the small-sized specimen is clamped to the pallet of the high-frequency vibration energy amplification and transfer device by a stepped mounting block, the small-sized specimen is tightly pressed between an upper platform of the stepped mounting block and the pallet, and a lower platform of the stepped mounting block is tightly pressed on the pallet with screws.

The distance between the lower surface of the upper platform of the stepped mounting block and the lower surface of the lower platform of the stepped mounting block is smaller than the thickness of the small-sized specimen, ensuring that the small-sized specimen can be tightly pressed between the upper platform of the stepped mounting block and the pallet.

The method for achieving better metal material properties by the high-frequency vibration welding conditioning system comprises the following steps:

1. manufacturing the high-frequency vibration energy amplification and transfer device which comprises the pallet for mounting the high-frequency vibration welding specimen, the chassis fixed on the vibration mesa, and the connecting rod connecting the pallet and the chassis; the cross-sectional area of the connecting rod being smaller than the cross-sectional area of the pallet and the chassis;

2. manufacturing the stepped mounting block which comprises the upper platform and the lower platform, the specimen being tightly pressed between the upper platform of the stepped mounting block and the pallet, the distance between the lower surface of the upper platform of the stepped mounting block and the lower surface of the lower platform of the stepped mounting block being smaller than the thickness of the small-sized specimen;

3. clamping the small-sized specimen for high-frequency vibration welding on the pallet; mounting the acceleration sensor on the pallet; fixing the chassis on the vibration mesa of the high-frequency vibrator, connecting the chassis to the pallet through the connecting rod, installing the welding chamber on the welding chamber supporting device, installing the welding chamber supporting device on the welding chamber base; mounting the high-frequency vibrator on the high-frequency vibrator base; turning on the signal connection between the host computer and the signal generator; turning on the signal connection between the signal generator and the power amplifier; turning on the signal connection between the power amplifier and the high-frequency vibrator; turning on the signal connection between the acceleration sensor and the charge amplifier; turning on the signal connection between the charge amplifier and the oscilloscope; turning on the signal connection between the oscilloscope and the host computer; turning on the power supply of the host computer, the signal generator, the power amplifier, the high-frequency vibrator, the charge amplifier, and the oscilloscope; activating the cooling module;

4. determining the output excitation frequency of the signal generator for high-frequency vibration welding employing frequency sweeping method.

5. cutting off the power supply of the charge amplifier and the oscilloscope; removing the acceleration sensor mounted on the pallet; slowly adjusting the gain knob of the power amplifier to make the power amplifier output a constant current, and driving the high-frequency vibrator to perform high-frequency vibration welding on the small-sized specimen.

The beneficial effects of the present invention are as follows:

1. A high-frequency vibration welding conditioning system for achieving better metal material properties of the present invention is capable of performing high-frequency vibration welding treatment on a metal material during solidification and crystallization process and a metal solid material, thereby achieving better properties of a metal material from the source of defect.

2. Employing the high-frequency vibration welding conditioning system and method thereof for achieving better metal material properties proposed by the present invention to perform high-frequency vibration welding treatment on a metal material can refine the grain and reduce the residual stress inside the material.

3. The high-frequency vibration welding conditioning system employed to achieve better metal material properties is controlled by a host computer when high-frequency vibration welding of a metal material is carried out, which eliminates the need for manual operation, reduces workload and improves working efficiency.

EMBODIMENTS

Figure 1:
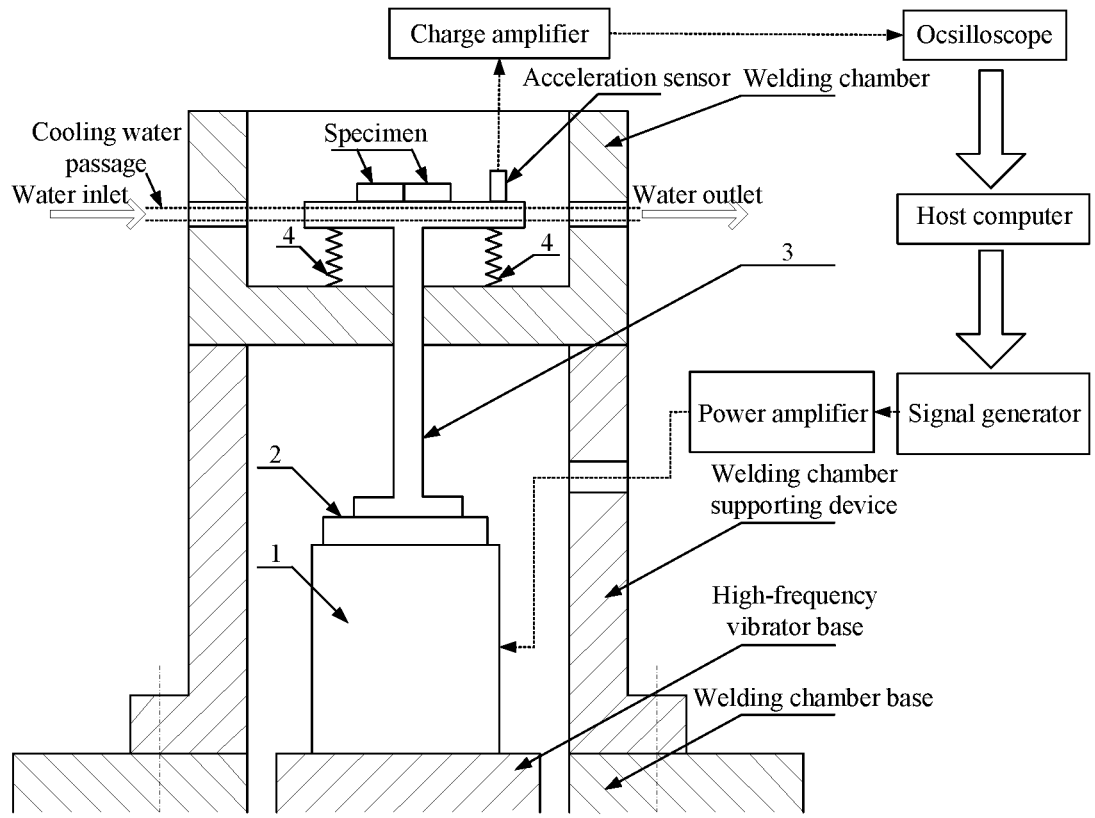
FIG. 1 is a schematic diagram of the high-frequency vibration welding conditioning system.
Figure 2:
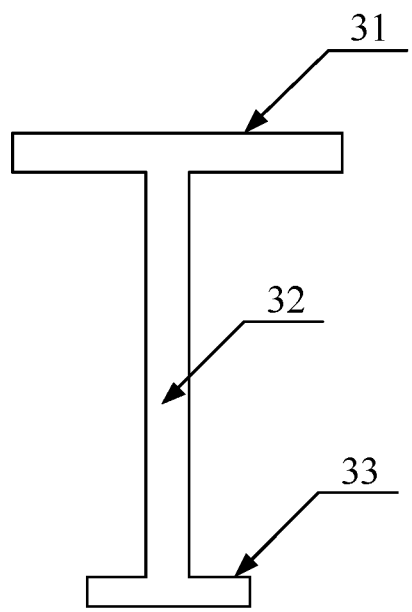
FIG. 2 is a schematic diagram of the high-frequency vibration energy amplification and transfer device.
Figure 3:
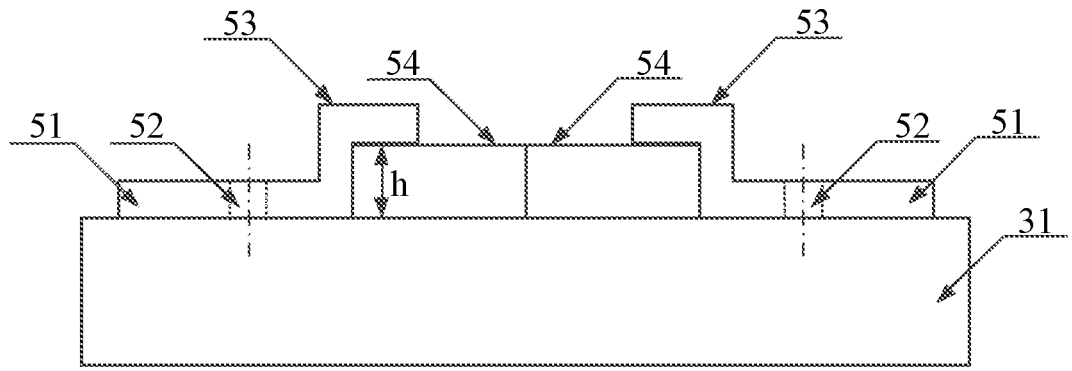
FIG. 3 is a schematic diagram of the stepped mounting block.

The present invention will be further described with reference to the accompanying drawings:

The high-frequency vibration welding conditioning system for achieving better metal material properties comprises a host computer, a signal generator, a power amplifier, a high-frequency vibrator 1, a high-frequency vibration energy amplification and transfer device 3, an acceleration sensor, and a cooling module; the host computer controlling the signal generator to output a sinusoidal excitation signal which is independently and continuously adjustable in amplitude and frequency, the sinusoidal excitation signal is inputted to the high-frequency vibrator 1 via the power amplifier;

The high-frequency vibration energy amplification and transfer device 3 is mounted on the vibration mesa 2 of the moving part of the high-frequency vibrator, and the high-frequency vibration energy amplification and transfer device 3 comprises a pallet 31 for mounting a high-frequency vibration welding specimen 54, a chassis 33 fixed on the vibration mesa 2, and a connecting rod 32 connecting the pallet 31 and the chassis 33; the cross-sectional area of the connecting rod 32 is smaller than the cross-sectional area of the pallet 31 and the chassis 33;

The acceleration sensor is mounted on the upper surface of the pallet 31, the output port of the acceleration sensor is connected to the input port of the charge amplifier, the output port of the charge amplifier is connected to the input port of an oscilloscope, and the oscilloscope is connected to the host computer.

Specifically, the pallet 31 for mounting the high-frequency vibration welding specimen 54 is placed in a welding chamber, the small-sized specimen 54 for welding is mounted on the upper surface of the pallet 31, and high-frequency vibration welding is performed on the small-sized specimen 54 at a resonance frequency of the high-frequency vibration energy amplification and transfer device 3, which is capable of achieving better post-welding properties of the small-sized specimen 54 after welding.

Further, the cooling module comprises a water inlet, a cooling water passage, and a water outlet.

Further, the welding chamber is mounted on the welding chamber supporting device, the welding chamber supporting device is mounted on the welding chamber base, and the high-frequency vibrator 1 is mounted on the high-frequency vibrator base.

Further, the spring element 4 is utilized to support the pallet 31 on which the high-frequency vibration welding specimen 54 is mounted.

Further, the acceleration sensor is a piezoelectric acceleration sensor.

Further, the small-sized specimen 54 is clamped to the pallet 31 of the high-frequency vibration energy amplification and transfer device 3 by a stepped mounting block, the small-sized specimen 54 is tightly pressed between the upper platform 53 of the stepped mounting block and the pallet 31, and the lower platform 51 of the stepped mounting block is tightly pressed on the pallet 31 with screws 52.

The distance between the lower surface of the upper platform 53 of the stepped mounting block and the lower surface of the lower platform 51 of the stepped mounting block is smaller than the thickness h of the small-sized specimen 54, ensuring that the small-sized specimen 54 can be tightly pressed between the upper platform 53 of the stepped mounting block and the pallet 31.

The method for achieving better metal material properties employing the high-frequency vibration welding conditioning system comprises the following steps:

1. manufacturing the high-frequency vibration energy amplification and transfer device 3 which comprises the pallet 31 for mounting the high-frequency vibration welding specimen 54, the chassis 33 fixed on the vibration mesa 2, and the connecting rod 32 connecting the pallet 31 and the chassis 33; the cross-sectional area of the connecting rod 32 being smaller than the cross-sectional area of the pallet 31 and the chassis 33;

2. manufacturing the stepped mounting block, which comprises the upper platform 53 and the lower platform 51, the small-sized specimen being tightly pressed between the upper platform 53 of the stepped mounting block and the pallet 31, the distance between the lower surface of the upper platform 53 of the stepped mounting block and the lower surface of the lower platform 51 of the stepped mounting block being smaller than the thickness of the small-sized specimen 54;

3. clamping the small-sized specimen 54 for high-frequency vibration welding on the pallet 31; mounting the acceleration sensor on the pallet 31; fixing the chassis 33 on the vibration mesa 2 of the high-frequency vibrator 1, connecting the chassis 33 to the pallet 31 through the connecting rod 32, installing the welding chamber on the welding chamber supporting device, installing the welding chamber supporting device on the welding chamber base; mounting the high-frequency vibrator 1 on the high-frequency vibrator base; turning on the signal connection between the host computer and the signal generator; turning on the signal connection between the signal generator and the power amplifier; turning on the signal connection between the power amplifier and the high-frequency vibrator 1; turning on the signal connection between the acceleration sensor and the charge amplifier; turning on the signal connection between the charge amplifier and the oscilloscope; turning on the signal connection between the oscilloscope and the host computer; turning on the power supply of the host computer, signal generator, power amplifier, high-frequency vibrator 1, charge amplifier, and oscilloscope; activating the cooling module;

4. determining the output excitation frequency of the signal generator for high-frequency vibration welding employing frequency sweeping method.

5. cutting off the power supply of the charge amplifier and oscilloscope; removing the acceleration sensor mounted on the pallet 31; slowly adjusting the gain knob of the power amplifier to make the power amplifier output a constant current, and driving the high-frequency vibrator 1 to perform high-frequency vibration welding on the small-sized specimen 54.

Figure 4:
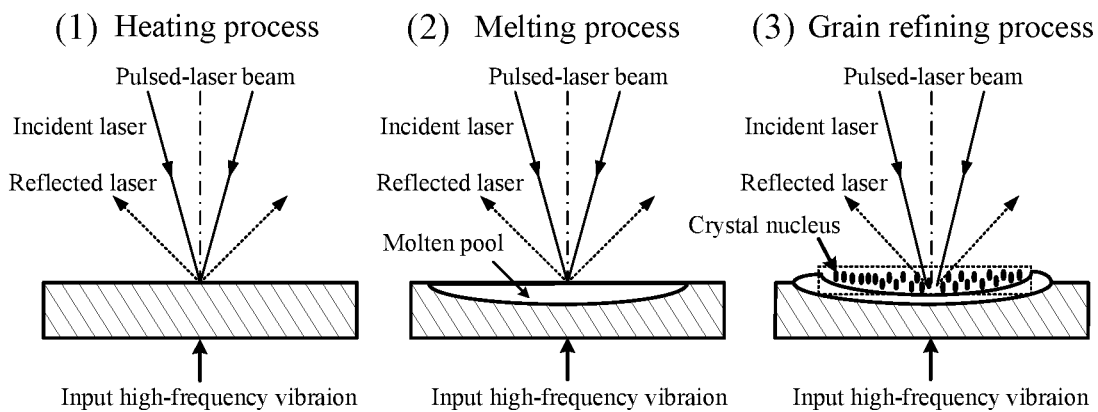
FIG. 4 is a schematic diagram of the refined grain of high-frequency vibration welding.
Figure 5:
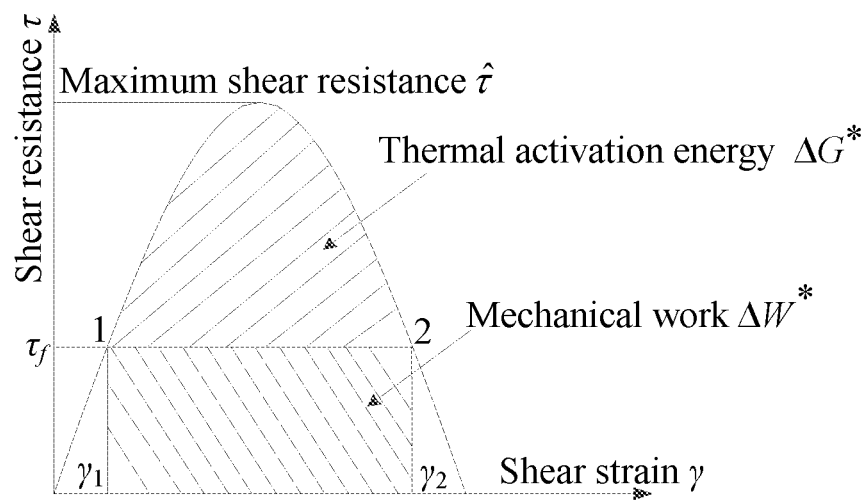
FIG. 5 is a schematic diagram of dislocation activation energy during high-frequency vibration welding.

The high-frequency vibration welding conditioning system of the present invention for achieving better metal material properties can achieve better properties of a material by performing high-frequency vibration treatment on the metal material during the welding process, which is mainly embodied in two aspects, one of which is the effect of high-frequency vibration on metal liquid. As shown in FIG. 4, the strength of a metal material is low in high-temperature welding, the columnar dendrites and dendrites formed in the weld pool are subjected to high-frequency vibration forces, and the columnar crystals and dendrites are very easy to be shattered, at the same time the shattered crystal particles can also become the core of crystal nucleation, i.e., the grain is refined, and the purpose of achieving better metal material properties after welding is achieved. In addition, the dislocation activation energy for the dislocation motion inside the microstructure of a metal material, as shown in FIG. 5, comprises thermal activation energy and mechanical work. The microscopic defects formed in the weld pool also produce microscopic defects such as dislocations, which cause residual stress inside the material. However, in high-temperature welding, the flow stress of plastic deformation of the metal material will decrease, i.e., the maximum shear resistance for the dislocation motion shown in FIG. 5 is reduced, so that the dislocation in the microstructure of material only needs relatively small shear force to move along the glide plane, resulting in microscopic plastic deformation, thus achieving the purpose of reducing internal residual stress of material and achieving better metal material properties after welding. By employing the high-frequency vibration welding conditioning system proposed by the present invention for achieving better metal material properties to perform high-frequency vibration treatment on a metal material in the welding forming process can refine the grain and reduce the residual stress inside the material, thereby achieving the purpose of improving the properties of metal material after welding.

The content described in the embodiments of the present specification is merely an enumeration of the implementation forms of the inventive concept, and the scope of the present invention shall not be construed as being limited to the specific forms expressed in the embodiments. Equivalent technical means that a skilled person of the art may construct from the conception of the present invention shall fall under the scope of the present invention.

The invention claimed is:

1. A vibration welding conditioning system for achieving metal material properties, comprising a host computer, a signal generator, a power amplifier, a vibrator, a vibration energy amplification and transfer device, an acceleration sensor, and a cooling module; wherein the host computer controls the signal generator to output a sinusoidal excitation signal which is independently and continuously adjustable in amplitude and frequency, the sinusoidal excitation signal is inputted to the vibrator via the power amplifier;

the vibration energy amplification and transfer device is mounted on a vibration mesa of a moving part of the vibrator, the vibration energy amplification and transfer device comprises a pallet for mounting a vibration welding specimen, a chassis fixed on the vibration mesa, and a connecting rod connecting the pallet and the chassis; a cross-sectional area of the connecting rod is smaller than a cross-sectional area of the pallet and the chassis;

the acceleration sensor is mounted on an upper surface of the pallet, an output port of the acceleration sensor is connected to an input port of a charge amplifier, an output port of the charge amplifier is connected to an input port of an oscilloscope, and the oscilloscope is connected to the host computer;

the vibration welding specimen is clamped to the pallet of the vibration energy amplification and transfer device by a stepped mounting block, and the vibration welding specimen is tightly pressed between an upper platform of the stepped mounting block and the pallet, and a lower platform of the stepped mounting block is tightly pressed on the pallet with a screw;

a spring element is employed for supporting the pallet on which the vibration welding specimen is mounted;

the pallet with the spring element and the vibration welding specimen, the chassis, and the connecting rod constitute a double mass spring damper sub-system;

the sinusoidal excitation signal causes the vibrator to vibrate, generating a vibration force on the double mass spring damper sub-system to resonate at a resonance frequency calculated by the host computer; the vibration force shatters a multitude of columnar dendrites and dendrites in a weld pool of the vibration welding specimen and produces a microscopic plastic deformation thereof for stress relief of the vibration welding specimen.

2. The vibration welding conditioning system for achieving metal material properties according to claim 1, wherein the cooling module comprises a water inlet, a cooling water passage, and a water outlet.

3. The vibration welding conditioning system for achieving metal material properties according to claim 1, wherein a welding chamber is mounted on a welding chamber support device and the welding chamber support device is mounted on a welding chamber base; the vibrator is mounted on a vibrator base.

4. The vibration welding conditioning system for achieving metal material properties according to claim 1, wherein the acceleration sensor is a piezoelectric acceleration sensor.

5. A method for achieving metal material properties employing the vibration welding conditioning system of claim 1, comprising the following steps:

a. arranging the vibration energy amplification and transfer device which comprises the pallet for mounting the vibration welding specimen, the chassis fixed on the vibration mesa, and the connecting rod connecting the pallet and the chassis; the cross-sectional area of the connecting rod being smaller than the cross-sectional area of the pallet and the chassis;

b. arranging the stepped mounting block which comprises the upper platform and the lower platform, the specimen being tightly pressed between the upper platform of the stepped mounting block and the pallet, the distance between the lower surface of the upper platform of the stepped mounting block and the lower surface of the lower platform of the stepped mounting block being smaller than a thickness of the specimen;

c. clamping the specimen for vibration welding on the pallet; mounting the acceleration sensor on the pallet; fixing the chassis on the vibration mesa of the vibrator, connecting the chassis to the pallet through the connecting rod, installing the welding chamber on the welding chamber supporting device, installing the welding chamber supporting device on the welding chamber base; mounting the vibrator on the vibrator base; turning on a signal connection between the host computer and the signal generator; turning on a signal connection between the signal generator and the power amplifier; turning on a signal connection between the power amplifier and the vibrator; turning on a signal connection between the acceleration sensor and the charge amplifier; turning on a signal connection between the charge amplifier and the oscilloscope; turning on a signal connection between the oscilloscope and the host computer; turning on power supply of the host computer, the signal generator, the power amplifier, the vibrator, the charge amplifier, and the oscilloscope; activating the cooling module;

d. determining output excitation frequency of the signal generator for vibration welding employing frequency sweeping method;

e. cutting off the power supply of the charge amplifier and the oscilloscope; removing the acceleration sensor mounted on the pallet; slowly adjusting a gain knob of the power amplifier to make the power amplifier output a constant current, and driving the vibrator to perform vibration welding on the specimen.

\* \* \* \* \*